United States Patent [19]

Li

[11] 4,196,183

[45] Apr. 1, 1980

[54] PROCESS FOR PURIFYING GEOTHERMAL STEAM

[75] Inventor: Charles T. Li, Richland, Wash.

[73] Assignee: The United States of America as represented by the United States Department of Energy, Washington, D.C.

[21] Appl. No.: 5,942

[22] Filed: Jan. 24, 1979

[51] Int. Cl.$^2$ .................. C01B 17/04; B01D 53/34
[52] U.S. Cl. ........................ 423/573 G; 423/224; 423/230
[58] Field of Search ............ 423/230, 231, 224, 573 G

[56] References Cited

U.S. PATENT DOCUMENTS

| | | | |
|---|---|---|---|
| 3,598,521 | 8/1971 | Alley | 423/224 |
| 3,634,028 | 1/1972 | Hohne | 423/230 |
| 4,088,743 | 5/1978 | Hass et al. | 423/573 G |

FOREIGN PATENT DOCUMENTS 282508  12/1927  United Kingdom ................ 423/573 G

OTHER PUBLICATIONS

Kohl et al., "Gas Purification", McGraw-Hill Book Co., Inc., 1975, pp. 260–263.
Hassler, "Activated Carbon", Chemical Publishing Company, Inc., 1963, pp. 270–273.
Ferguson, "Hydrogen Sulfide Removal from Gases, Air & Liquids" Pollution Technology Review 22, Noyes Data Corp. 1975, pp. 246–249.

*Primary Examiner*—Earl C. Thomas
*Attorney, Agent, or Firm*—R. V. Lupo; Frank H. Jackson; James W. Weinberger

[57] ABSTRACT

Steam containing hydrogen sulfide is purified and sulfur recovered by passing the steam through a reactor packed with activated carbon in the presence of a stoichiometric amount of oxygen which oxidizes the hydrogen sulfide to elemental sulfur which is adsorbed on the bed. The carbon can be recycled after the sulfur has been recovered by vacuum distillation, inert gas entrainment or solvent extraction. The process is suitable for the purification of steam from geothermal sources which may also contain other noncondensable gases.

5 Claims, No Drawings

PROCESS FOR PURIFYING GEOTHERMAL STEAM

CONTRACTUAL ORIGIN OF THE INVENTION

The invention described herein was made in the course of, or under, a contract with the UNITED STATES DEPARTMENT OF ENERGY.

BACKGROUND OF THE INVENTION

Geothermal steam is a natural resource and is found in many areas of the earth. It has been used for power generation in some areas for many years. Use of large quantities of geothermal steam for power generation will become increasingly important in the present energy short economy. However, development of many geothermal energy sources is hindered because geothermal fluids often contain contaminants such as $CO_2$, $H_2$, $H_2S$, $NH_3$, $CH_4$, and $N_2$. $H_2S$ is not only environmentally objectionable but presents potentially serious problems of corrosion to power generating turbines and associated equipment. Corrosion of power generating equipment significantly lowers the plant operating efficiency and increases maintenance costs. To operate geothermal power plants efficiently and safely, $H_2S$ and other corrosive and environmentally hazardous impurities of geothermal steam must be removed before the steam is used for power generation.

Previous studies for the removal of $H_2S$ from geothermal steam have emphasized the utilization of solid metal sorbents such as zinc oxide, or other sorbents containing zinc oxide. The major difficulty with these materials is the formation of metal sulfates during oxidative regeneration, with subsequent decrepitation of sorbent beads and destruction of their sorption capacity. Some physical adsorption materials such as silica, alumina and activated carbon, although effective with $H_2S$ in dry systems, will not preferentially absorb $H_2S$ from steam.

The use of activated carbon to catalyze the oxidation of $H_2S$ to elemental sulfur according to the formula: $2H_2S + O_2 \rightarrow 2H_2O + 2S$ is well known and has been used for many years for the purification of gas streams. Streams being treated by the oxidation process are mainly natural gas, manufactured gas, coke oven gas, carburetted water gas and synthesis gas. All of the above gas streams are low in moisture (or water vapor). To date, the removal of $H_2S$ by the oxidation reaction from gas streams of high moisture content by the oxidation reaction has been considered as an impractical method. The main reason for drawing this conclusion is that the water vapor in gas streams to be treated is also a product of the oxidation reaction. A well-known therorem established by Le Chatelier states that when equilibrium has been reached, a change in any of the factors affecting equilibrium tends to make that reaction take place which will neutralize the effect of the change. For this reason, it has heretofore been assumed that the conditions in a geothermal gas stream containing 99% water vapor, and about 200 parts per million of $H_2S$ are unfavorable for the oxidation reaction.

SUMMARY OF THE INVENTION

However, it has been found that, under the proper conditions, the oxidation reaction can take place even in gas streams of high moisture content such as geothermal steam. The use of activated carbon as a catalyst is necessary for enhancing the reaction rate and reducing the reaction size. Thus the invention for purifying steam containing hydrogen sulfide and recovering the sulfur consists of passing the steam through a reactor packed with activated carbon in the presence of oxygen at a temperature above the saturation temperature of the steam whereby the $H_2S$ is oxidized to elemental sulfur which is sorbed on the surface of the carbon and remains in the reactor, thereby purifying the steam of hydrogen sulfide. The sulfur is later recovered from the reactor by various methods such as solvent extraction, vacuum distillation and inert gas or steam entrainment. The carbon, after the sulfur is removed, can then be recycled.

It is therefore one object of the invention to provide a process for removing hydrogen sulfide from steam.

It is the other object of the invention to provide a process for removing hydrogen sulfide from geothermal steam and recovering the sulfur.

DESCRIPTION OF THE PREFERRED EMBODIMENT

These and other objects of the invention for removing hydrogen sulfide from steam may be met by passing the steam containing the hydrogen sulfide at a temperature above its saturation temperature and below about 235° C., through a reactor packed with activated carbon in the presence of at least 1.3 times the stoichiometric amount of oxygen whereby the hydrogen sulfide in the steam is oxidized to elemental sulfur, which is sorbed on the surface of the carbon packed into the reactor, and water, which passes through the reactor with the steam, thereby removing the hydrogen sulfide from the steam.

The process of this invention is suitable for the removal of $H_2S$ contained in steam from any source. Generally $H_2S$ concentration in steam from geothermal sources may vary from 20 to greater than about 225 ppm. The process of the invention may require additional beds of activated carbon when higher $H_2S$ concentrations are encountered. The presence of other noncondensable gases such as $CH_2$, $H_2$, $CO_2$ and $NH_3$ was found to have no deleterious effect upon the oxidation process.

The preferred oxidation catalyst is activated carbon which may contain a small amount of metal oxide such as up to about 5 to 10 weight percent CuO or $Fe_2O_3$. Other catalysts such as $Al_2O_3$, $TiO_2$ and TiS may also be used although with decreased efficiency. Activated carbon is preferred because it is readily available and inexpensive. The carbon is preferably in the shape of pellets to minimize the pressure drop of the steam as it passes through the bed.

It is necessary to add oxygen to the steam as it passes through the catalyst bed in order to promote the oxidation of the $H_2S$ to elemental sulfur and water. The amount of oxygen, which may be added as either pure oxygen or as air, may range from about 1.3 to 1.6, preferably 1.5 times the stoichiometric amount. Too little oxygen may result in some of the $H_2S$ not being oxidized while too much oxygen may result in converting some of the $H_2S$ to oxygenated sulfur compounds such as $SO_2$ and $SO_3$ which will remain in the steam. Furthermore, excess oxygen in the treated steam may cause corrosion of the power generation equipment.

In order to prevent binding of active catalyst sites by moisture, it is necessary that the steam be superheated, that is, that the temperature of the steam be from 3° to 6° C. above its saturation temperature. When the process is operated above 235° C., entrainment of sulfur from the catalyst by the heated steam becomes significant and may be detrimental to the equipment; therefore, the steam temperature or the reactor temperature must be controlled under 235° C. To remove $H_2S$ from a wet steam, the steam may be adiabatically throttled or isobarically superheated with a heat source such as an electrical or oil burning furnace to form superheated steam before it is contacted with the bed of activated carbon.

Regeneration of the spent catalyst and recovery of the sulfur can be accomplished by solvent extraction, vacuum distillation and inert gas entrainment. The lesser energy is required for the solvent extraction. Preferred extractants are carbon disulfide, an aqueous solution of about 15% ammonium sulfide and dichloroethane. The extracted sulfur can be recovered by evaporating the extracted solution to separate solid sulfur and pure solvent or by chilling the extracted solution to a temperature where the sulfur which is excess to the amount which can be dissolved in the solvent at that temperature is precipitated from the extracted solution. Solid sulfur recovered by the aforesaid methods is a by-product of the process, and the solvent after being separated from the solid sulfur can be reused. The sulfur can also be thermally distilled from the sulfur laden activated carbon under a vacuum condition and recovered as a liquid sulfur in a condenser. The other sulfur recovery method is accomplished by purging hot inert gas through the bed of sulfur laden activated charcoal, thus the sulfur is vaporized and entrained by the hot inert gas to a condenser where sulfur vapor is condensed and recovered in form of liquid.

EXAMPLE I

To demonstrate the process, various experiments were conducted using simulated geothermal steam (175° C. and 100 psig) with $H_2S$ concentration of 250–200 ppm. Three types of activated carbons, carbon with CuO impregnated, plain coconut charcoal, and a regenerated carbon were used. The results are given in Table I below.

The pressure of the steam as it contacted the carbon was found to have no effect upon the process of the invention. Space velocities of steam through the carbon bed may range up to about 300 v/v/min with velocities up to about 200 being preferred.

TABLE I

| RUN | 70 | 75 | 77 | 78 |
|---|---|---|---|---|
| SORBENT | G-32J ACTIVATED CARBON +CuO (5%) | G-32J ACTIVATED CARBON +CuO (5%) | COCOANUT CHARCOAL | REGENERATED SORBENT OF RUN 75 |
| WT OF SORBENT | 88g | 85g | 85g | 86g |
| TOTAL RUN TIME | 10.5 hrs | 11.25 hrs | 17.31 hrs | 11.21 hrs |
| STEAM RATE (AS WATER) | 76.8 ml/min | 91 ml/min | 80 ml/min | 74.5 ml/min |
| SPACE VELOCITY | 107/min | 132/min | 116/min | 107/min |
| AIR FLOW RATE | 200 ml/min | 200 ml/min | 98 ml/min | — |
| OXYGEN | 42 ml/min | 42 ml/min | 20 ml/min | 98 ml/min, 40 ml/min, 25 ml/min, 11 ml/min |
| $H_2S/O_2$ | ½ | ½ | 1/1.4 | 1/6.8, 1/2.8, 1/1.7, 1/0.75 |
| INLET $H_2S$ CONC. ppm | 164.7 | 211 | 185 | 153 |
| OUTLET $H_2S$ CONC. ppm | 0 TO 8 HRS <20 ppm AFTER 8 HRS → 38 ppm | 0 TO 9.5 HRS <20 ppm AFTER 9.5 HRS → 42 ppm | MOST OF TIME <15 ppm | MOST OF TIME <15 ppm |
| ACTIVATED CARBON WT INCREASE | 4.5 g. 5.3% | 6.8 g. 8.0% | 8.2 g. 9.6% | NOT AVAILABLE |

The results of these runs show that more than 90 percent $H_2O$ removal has been accomplished, i.e. a decrease of 250 ppm $H_2S$ to lower the 25 ppm $H_2S$. Activity of the catalyst does not reduce significantly in the first few regeneration cycles. For catalyst regeneration and sulfur recovery, $CS_2$ was used. Crystalline sulfur has been recovered by the $CS_2$ extraction method.

EXAMPLE II

A number of additional runs were made following the procedure of Example I to show the operability of the process for removing $H_2S$ from steam. The results are given in Table II below. Note that the results generally show better than 97% sulfur removal.

TABLE II

| Run No. | 124 | 126 | 127 | 128 | 129 | 131 |
|---|---|---|---|---|---|---|
| Catalyst | Activated Carbon from Bituminous Coal + CuO (5%) | Activated Carbon Impregnated With about 3 w/o $Fe_2O_3$ | Cocoanut Charcoal Activated With High-Temp. Steam | Cocoanut Charcoal Activated With High-Temp. Steam | Activated Carbon from Bituminous Coal + CuO (5%) | Regenerated Activated Carbon from Bituminous Coal + CuO (5%) |
| Wt. of Cat. gm | 80 | 80 | 80 | 80 | 80 | 78.8 |
| Bed Volume, $Cm^3$ | 128.8 | 114.1 | 143.5 | 164.9 | 131.7 | 132.5 |
| Steam Rate, $gm/cm^2/min$ | 20.2 | 20.5 | 20.6 | 20.8 | 21.0 | 20.8 |
| Space Velocity, /min | 184.6 | 211.1 | 168.9 | 148.4 | 186.6 | 184.4 |
| Residence Time, Sec | 0.325 | 0.284 | 0.355 | 0.404 | 0.322 | 0.325 |
| Air Rate, | 50 | 50 | 50 | 50 | 50 | 50 |

TABLE II-continued

| Run No. | 124 | 126 | 127 | 128 | 129 | 131 |
|---|---|---|---|---|---|---|
| Catalyst | Activated Carbon from Bituminous Coal + CuO (5%) | Activated Carbon Impregnated With about 3 w/o Fe$_2$O$_3$ | Cocoanut Charcoal Activated With High-Temp. Steam | Cocoanut Charcoal Activated With High-Temp. Steam | Activated Carbon from Bituminous Coal + CuO (5%) | Regenerated Activated Carbon from Bituminous Coal + CuO (5%) |
| ml/min Oxygen | 1.59 | 1.57 | 1.71 | 1.49 | 1.47 | 1.55 |
| Stoichiometric Average | 3.26 | 2.98 | 4.4 | 11.8 | 2.68 | 1.27 |
| Outlet, ppm Outlet Oxygen | 57.5 | 54.7 | 62.2 | 52.9 | 47.6 | 51.9 |
| Conc., ppm % H$_2$S Removed | 98.4 | 98.5 | 97.5 | 94.3 | 98.7 | 99.4 |
| % Sulfur Recovery | 61.9 | 77.9 | 80.3 | 87.99 | 64.62 | 69.39 |

As can be seen from the preceding discussion and examples, the process of this invention provides an effective and economical method for the removal of hydrogen sulfide from geothermal steam so that a highly purified steam is available for utilization in power generation equipment without resulting in excessive equipment corrosion.

The embodiments of the invention in which an exclusive property or privelege is claimed are defined as follows:

1. A process for purifying steam from geothermal sources containing hydrogen sulfide and a minor amount of other non-condensable gases comprising:
   adding at least a stoichiometric amount of O$_2$ to the steam containing the hydrogen sulfide; and
   passing the steam containing oxygen at a temperature above its saturation temperature and below about 235° C. through a reactor packed with activated carbon to oxidize the hydrogen sulfide to elemental sulfur and water whereby the elemental sulfur is adsorbed on the activated carbon while the water passes through the bed with the steam, thereby purifying the steam.

2. The process of claim 1 wherein the oxygen is present in the steam in an amount of from 1.3 to 1.6 times the stoichiometric amount.

3. The process of claim 2 wherein the steam containing hydrogen sulfide is at a temperature at least 3° to 6° C. above its saturation temperature.

4. The process of claim 3 including the additional step of recovering the sulfur from the charcoal.

5. The process of claim 4 wherein the sulfur is recovered from the charcoal by contacting the charcoal with a solvent selected from the group consisting of carbon disulfide, ammonium sulfide and dichloroethane whereby the sulfur dissolves in the solvent, separating the solution containing the sulfur from the carbon, and recovering the sulfur from the solvent.

* * * * *